(12) United States Patent
Park

(10) Patent No.: US 7,653,478 B2
(45) Date of Patent: Jan. 26, 2010

(54) METHOD OF CONTROLLING ENGINE STOP POSITION IN HYBRID ELECTRIC VEHICLE

(75) Inventor: Young Kug Park, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 267 days.

(21) Appl. No.: 11/940,438

(22) Filed: Nov. 15, 2007

(65) Prior Publication Data

US 2008/0127935 A1 Jun. 5, 2008

(30) Foreign Application Priority Data

Nov. 13, 2006 (KR) .................. 10-2006-0111562

(51) Int. Cl.
*G06F 19/00* (2006.01)
*F02N 17/00* (2006.01)
*B60K 6/24* (2007.10)

(52) U.S. Cl. .................. 701/112; 123/179.4; 903/905; 180/65.28; 701/110

(58) Field of Classification Search ............. 123/179.3, 123/179.4, 179.16, 198 DB, 481, 491; 701/101–105, 701/110, 112, 113, 115; 180/65.21, 65.27, 180/65.28; 477/3–6; 903/950

See application file for complete search history.

(56) References Cited

U.S. PATENT DOCUMENTS 6,283,239 B1 * 9/2001 Tsukamoto et al. ...... 180/65.25

| | | | |
|---|---|---|---|
| 6,807,476 B2 * | 10/2004 | Ando et al. .................. | 701/110 |
| 7,228,209 B2 * | 6/2007 | Izawa et al. .................. | 701/22 |
| 7,380,620 B2 * | 6/2008 | Suzuki ..................... | 180/65.28 |
| 7,562,650 B2 * | 7/2009 | Tabata et al. ................ | 123/491 |
| 2009/0132150 A1 * | 5/2009 | Kajiyama et al. ........... | 701/103 |

FOREIGN PATENT DOCUMENTS

| JP | 2000-283010 | | 10/2000 | |
|---|---|---|---|---|
| JP | 2001-254646 | | 9/2001 | |
| JP | 2004092623 A | * | 3/2004 | ............. 123/179.4 |
| JP | 2004-124878 | | 4/2004 | |
| JP | 2004-253220 | | 9/2004 | |
| KR | 2002-0070985 | | 2/2002 | |
| KR | 2005-0095631 | | 9/2005 | |

* cited by examiner

*Primary Examiner*—Willis R Wolfe, Jr.
(74) *Attorney, Agent, or Firm*—Morgan, Lewis & Bockius LLP

(57) ABSTRACT

A method of controlling an engine stop position in a hybrid electric vehicle having a motor capable of controlling engine speed is provided. The method includes: a) reducing the engine speed according to an first engine speed reduction rate using the motor in a state where fuel supplied to the engine is cut off; b) after the engine speed is reduced to first reference speed, adjusting an actual engine speed reduction rate according to second engine speed reduction rate using the motor, and monitoring a current crank position to count the number of times when the current crank position coincides with a given target engine stop position; and c) if the number of times is more than a predetermined number and if the actual engine speed is equal to or below second reference speed, stopping the engine using the motor when the current crank position coincides with the target engine stop position.

4 Claims, 5 Drawing Sheets

FIG. 5

METHOD OF CONTROLLING ENGINE STOP POSITION IN HYBRID ELECTRIC VEHICLE

CROSS-REFERENCE TO RELATED APPLICATION

This application claims priority under 35 U.S.C. §119(a) of Korean Patent Application No. 10-2006-0111562, filed on Nov. 13, 2006, and No. 10-2007-0038445, filed on Apr. 19, 2007, the entire contents of which are incorporated herein by reference.

BACKGROUND OF THE INVENTION (a) Field of the Invention

The present invention relates to a method of controlling an engine stop position in a hybrid electric vehicle. More particularly, the present invention relates to a method of controlling a crankshaft position when an engine is to be stopped in a hybrid electric vehicle so as to minimize torque ripple and vibrations generated during intake, compression and expansion strokes when the engine starts up.

(b) Background Art

In general, a hybrid electric vehicle (HEV) utilized both an engine and a motor driven by a battery power source. Typical HEVs are either parallel type or series type, and include an engine control unit (ECU); a motor control unit (MCU); a transmission control unit (TCU); a battery management system (BMS); a full auto temperature controller (FATC), which controls room temperature; and the like.

Such controllers are linked with each other through a high-speed CAN communication line (e.g. 500 kbps), which is controlled by a hybrid control unit (HCU). Cooperative control is performed between the HCU, acting as the superior controller, and the other, subordinate controllers.

The HCU exchanges information with the subordinate controllers through the CAN communication and controls the subordinate controllers. That is, the HCU receives information on engine torque, engine speed, start key, throttle/coolant temperature, and on the like from the ECU. Moreover, the HCU transmits a fuel injection command signal, an engine stop command signal, a fuel injection cut-off command signal, and information on electric motor start-up, idle stop, and the like, to the ECU.

Moreover, the HCU substantially controls the operation of the electric motor through the MCU. In this case, the MCU controls drive torque and speed of the electric motor according to the control signals transmitted from the HCU, thus maintaining the driving performance.

An integrated starter generator (ISG) functions as both a starter motor and a generator for charging the battery.

The ISG is connected to the engine by a belt to rotate synchronously with the engine. Accordingly, the rotational speed of the ISG is determined in accordance with a pulley ratio from the engine speed. Moreover, the ISG performs the functions of starting the engine during the engine start-up, generating high power for charging the battery using the rotational force of the engine while driving, and stopping the engine in a state where the fuel supplied to the engine is cut-off when the engine is to be turned off.

Piston and crankshaft stop positions (engine stop position) change every time the engine is stopped. Accordingly, if the ISG supplies a predetermined starting torque to the engine to restart the engine, torque ripple and vibration are generated from the engine according to the variation of the engine stop position.

Accordingly, in order to prevent engine vibration, it is desirable to control the engine stop position, i.e. the piston and crankshaft positions, regularly at all times when the engine is to be stopped.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

In summary, one preferred aspect of the present invention is directed to a method of controlling an engine stop position in a hybrid electric vehicle having a motor capable of controlling engine speed. The method includes: a) reducing the engine speed according to a first engine speed reduction rate using the motor in a state where fuel supplied to the engine is cut off when the engine is to be stopped; b) after the engine speed is reduced to first reference speed, adjusting an actual engine speed reduction rate according to an second engine speed reduction rate using the motor, and monitoring a current crank position by processing signals of a crank sensor and a cam sensor to count the number of times when the current crank position coincides with a given target engine stop position; and c) if the number of times is more than a predetermined number and if the actual engine speed is below second reference speed, stopping the engine using the motor when the current crank position coincides with the target engine stop position.

In step b), once a missing tooth of the crank sensor is detected from the signals of the crank sensor and the cam sensor, a pulse falling edge of the crank sensor is counted from the detected missing tooth and then, if the counted number of pulse falling edges is equal to a falling edge reference number equal to the target engine stop position, it may be determined that the current crank position coincides with the target engine stop position.

In the process of detecting the missing tooth, after counting the number of pulse falling edges of the crank sensor signal from a time when a falling edge of the cam sensor signal is input, if the counted number of falling edges is equal to a predetermined reference number, the missing tooth may be detected.

Furthermore in the step of b), in the process of reducing the engine speed, the control unit may perform PID control using a velocity gain value in accordance with the current engine coolant temperature obtained from previously input map data so as to obtain the target engine speed in accordance with second engine speed reduction rate.

The above features and advantages of the present invention will be apparent from or are set forth in more detail in the accompanying drawings, which are incorporated in and form a part of this specification, and the following Detailed Description of the Invention, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein:

FIG. 5 is a diagram showing signals of a crank sensor and a cam sensor in a variable valve timing (VVT) engine.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention provides a method of controlling an engine stop position in a hybrid electric vehicle (HEV). More particularly, the present invention provides a method of controlling a crankshaft position to make an engine stopped at the same position when an engine is to be stopped, so as to minimize torque ripple and vibration generated during intake, compression and expansion strokes when the engine starts up.

In a typical HEV, the piston and crankshaft stop positions (engine stop position) are different every time the engine is stopped. Accordingly, if an integrated starter generator (ISG) supplies a predetermined starting torque to the engine to restart the engine, torque ripple and vibration are generated from the engine due to the variation of the engine stop position.

Accordingly, in order to prevent the generation of torque ripple and vibration in the engine, it is necessary to control the crankshaft stop position, that is, the engine stop position to make an engine stopped at the same position whenever the engine is to be stopped. Embodiments of the present invention regularly control the crankshaft stop position by momentarily stopping the engine by a starter motor (ISG) when the crankshaft position coincides with a given target engine stop position, if certain conditions are satisfied after monitoring the crankshaft position when the engine is to be stopped.

Figure 1:
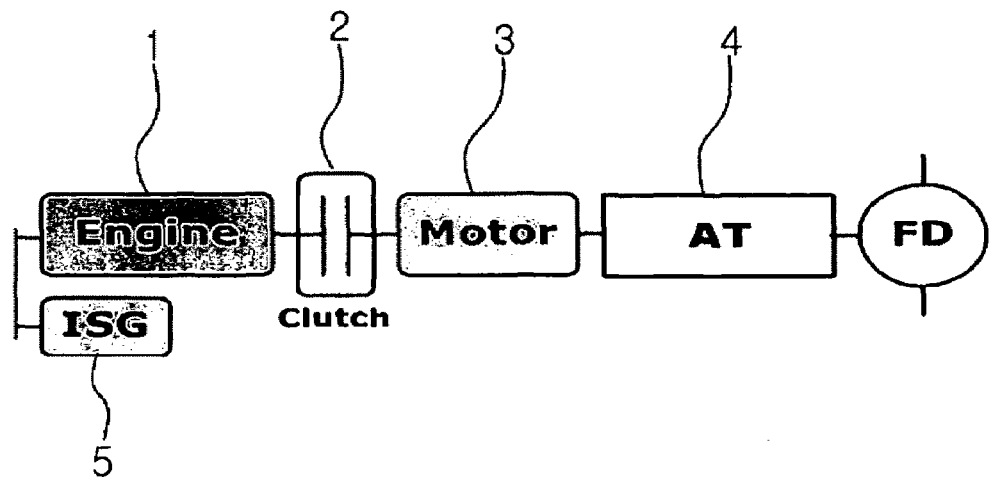
FIG. 1 is a schematic diagram showing a drive unit of a hybrid electric vehicle.
Figure 2:
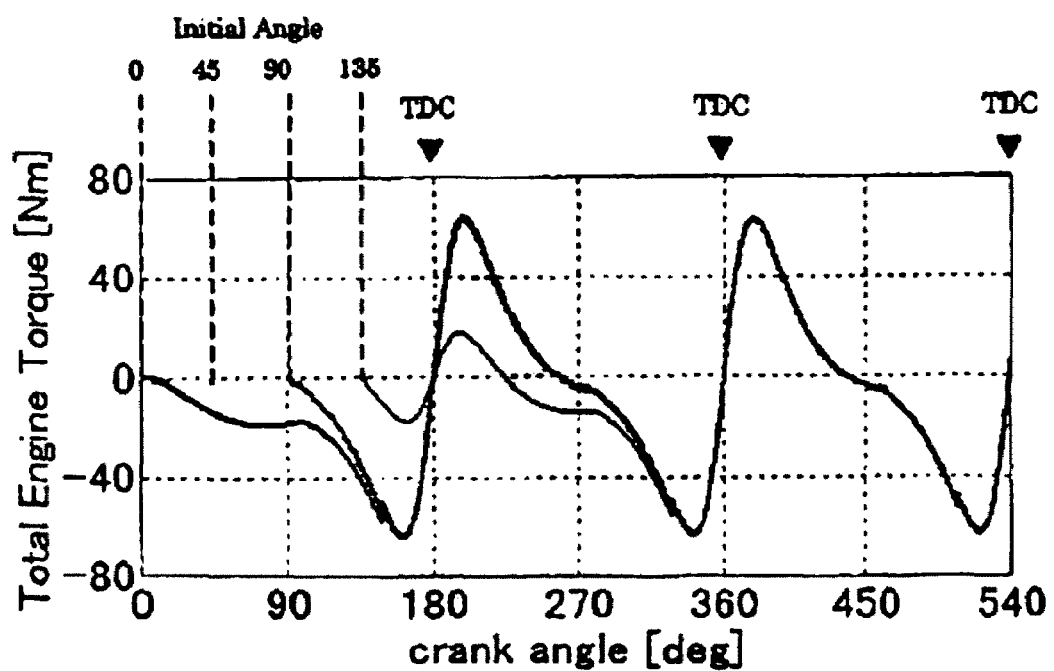
FIG. 2 is a graph showing the variation of starting torque according to an engine stop position.
Figure 3:
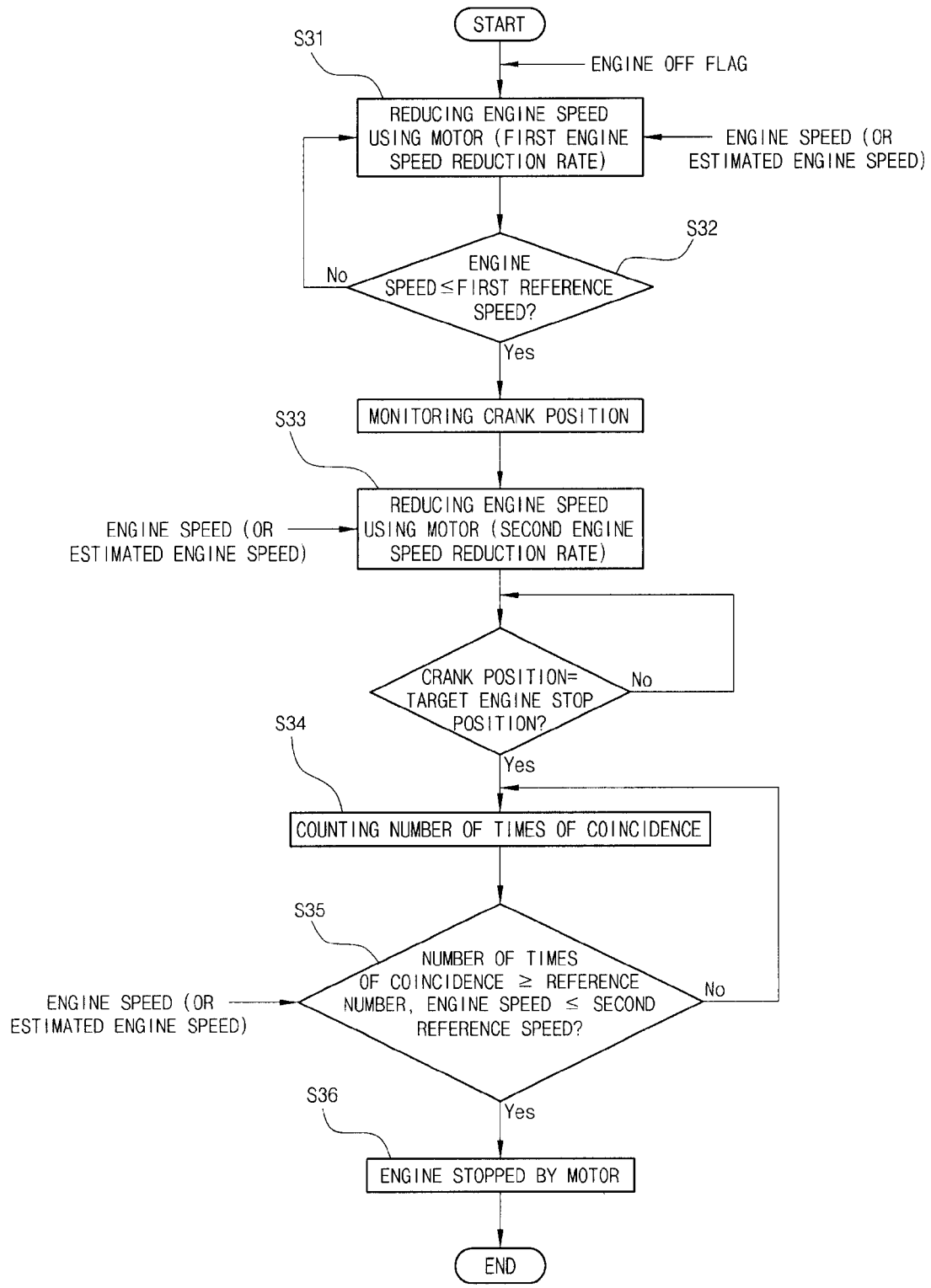
FIG. 3 is a flowchart illustrating a method of controlling an engine stop position in accordance with an exemplary embodiment of the present invention.

FIG. 3 is a flowchart showing an exemplary method of controlling an engine stop position, in which a control process is performed by an engine position control module (hereinafter referred to as the control module) of a control unit. Here, the control unit may be a hybrid control unit (HCU), and may include a processor, memory, and associated hardware, software, and/or firmware as may be selected and programmed by a person of ordinary skill in the art based on the teachings herein.

First, when the engine is to be stopped, if the HCU cuts off fuel supplied to the engine (outputs a fuel injection cut-off command signal) and the control module is driven to enter an engine-off state, the control module controls the starter motor (ISG) through a motor control unit (MCU) to reduce the engine speed according to predetermined first engine speed reduction rate at step 31.

Subsequently, if the current actual engine speed (or an estimated engine speed calculated from the speed of the starter motor) is equal to or less than first reference speed at step 32, the control module monitors the crankshaft position by processing signals of a crank sensor and a cam sensor.

The engine speed reduction rate is then adjusted to second engine speed reduction rate, which is relatively low at step 33. The control module reduces the engine speed through the starter motor according to second engine speed reduction rate which is lower than the first engine speed reduction rate. During the speed reduction control, the control module monitors the crank position to count the number of times when the current crank position coincides with a given target engine stop position at step 34.

Next, if the counted number of times when the current crank position coincides with the target engine stop position is more than a predetermined number and if the current actual or estimated engine speed is below second reference speed at step 35, the control module outputs an engine stop request signal to the MCU when the current crank position is equal to the target engine stop position at step 36.

Therefore, the MCU controls the starter motor to momentarily stop the engine and thereby the engine is stopped at a target stop position (engine speed=0).

Second reference speed is an engine speed at which the starter motor (ISG) can overcome torque ripple and regulate the engine with a constant speed, and a minimum engine speed at which the crank signal can be processed by the HCU.

The crank position thus coincides with the target engine stop position when the engine is to be stopped. The above-described control process may be carried out every time the engine is to be stopped, thus continuously controlling the crank position (engine stop position) to coincide with the target engine stop position at all times.

Figure 4:
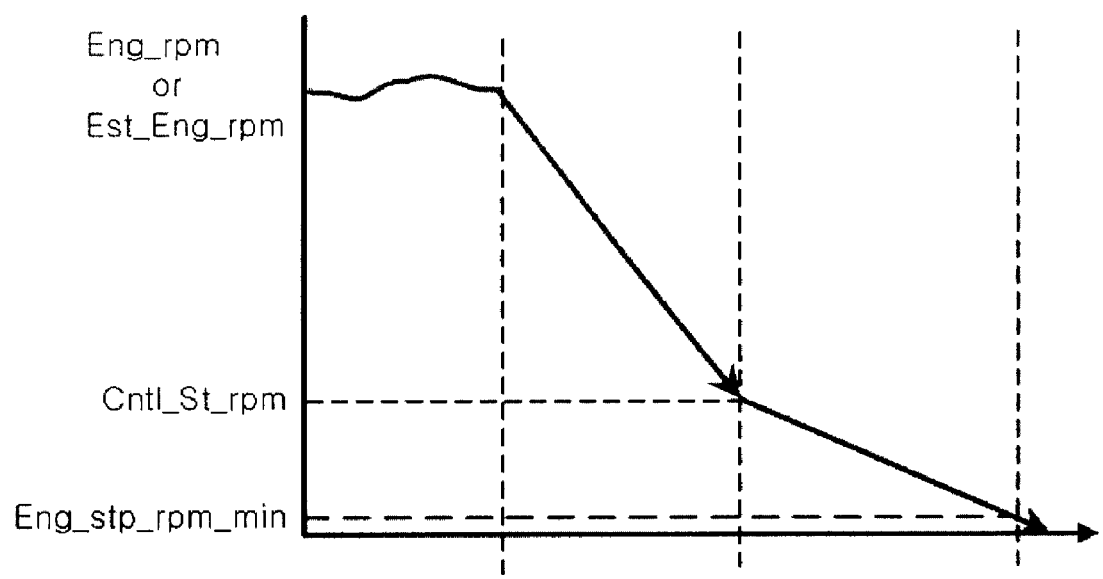
FIG. 4 is a graph illustrating an engine speed reduction controlled by a control process in accordance with an exemplary embodiment of the present invention.

FIG. 4 is a graph illustrating an engine speed reduction controlled in accordance with the present invention, in which Eng_rpm denotes an actual engine speed, Est_Eng_rpm denotes an estimated engine speed calculated from the speed of the starter motor, Cntl_St_rpm denotes first reference speed and Eng_stp_rpm_min denotes second reference speed.

Counting the number of times when the current crank position is equal to the target engine stop position by monitoring the crank position during engine speed reduction control will be described in detail with reference to FIGS. 5 and 6.

The HCU monitors the crank position, i.e., the crankshaft position, using signals of a crank sensor and a cam sensor in the engine and, if the above-described certain conditions are satisfied, stops the engine using the starter motor when the crank position coincides with the target engine stop position.

Figure 5:
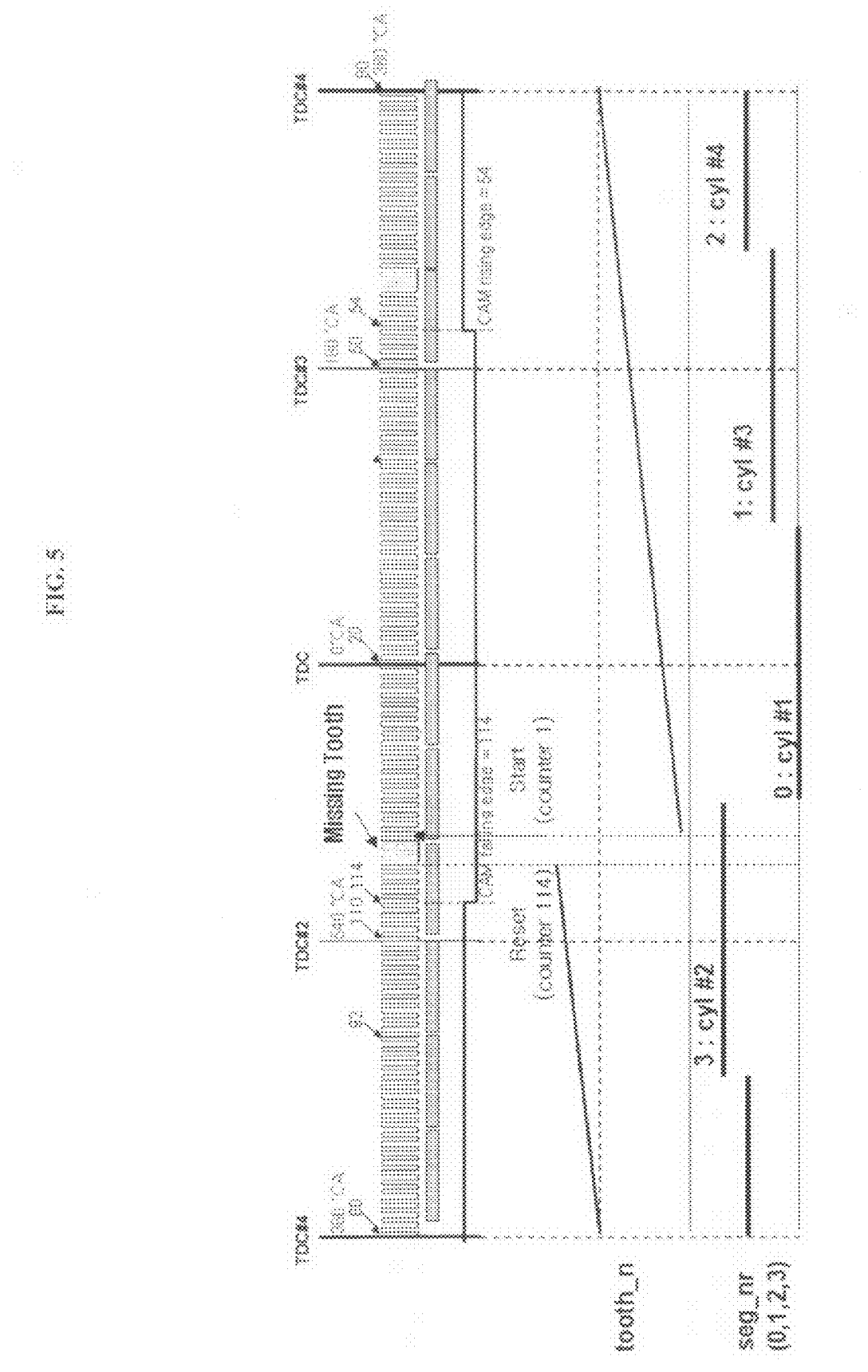

FIG. 5 illustrates signals of a crank sensor and a cam sensor in a variable valve timing (VVT) engine. Generally, a sensor wheel of a crank position sensor (ckp sensor), has 58 teeth, with 2 teeth removed, or "missing." Since the sensor wheel makes two revolutions (720°) during an engine cycle, a total of 116 pulse signals (without the four missing teeth) is output from the crank sensor as shown in FIG. 5.

In an engine employing a half moon cam, the signal of the cam sensor includes a falling edge and a rising edge during each cycle as shown in FIG. 5.

Conventionally detecting the missing tooth from the signal of the crank sensor and synchronizing cylinder number 1 using the signal variation of the cam sensor, if performed in an ECU, is complicated. If such a conventional process were used for the present invention, it may take a lot of time to process.

Accordingly, the inventive method may employ a simpler process from the signals of the crank sensor and the cam sensor.

Reviewing the cam behavior in a variable valve timing (VVT) engine, the cam is set at a maximum retard position when the engine is stopped, whereas, the cam advances as engine load is increased after the engine start-up.

If an engine drive mode is changed to a motor drive mode (EV mode) while the engine generates torque under specific load conditions, the fuel supplied to the engine by the HCU is cut off and then the engine is stopped by the starter motor.

The cam position in the VVT engine, in a state where the fuel injection is cut off when the engine is to be stopped, is set at the maximum retard position at all times as shown in FIG. 5 (the falling edge of the cam sensor signal is positioned prior to a predetermined pulse number, i.e., the number of pulse falling edges, of the crank sensor signal).

Therefore, if using the maximum retard position of the cam, set when the fuel is cut off when the engine is to be stopped and no torque is generated in the engine, the HCU can easily detect the missing tooth and use it as a synchronization signal for engine stop position control.

The HCU, i.e., the stop position control module, detects the missing tooth from the signal of the crank sensor and the cam sensor by counting the number of pulse falling edges of the crank sensor after the falling edge of the cam sensor signal is input. If the counted number of pulse falling edges is equal to first reference number, the HCU determines that position as the missing tooth position.

As described above, the cam is set at the maximum retard position at all times when the fuel supplied to the engine is cut off and no torque is generated in the engine. Accordingly, the falling edge of the cam sensor signal is positioned prior to the number of pulse falling edges of the crank sensor signal from the missing tooth position at all times, and the detected falling edge of the cam sensor signal is used in the engine stop position control process. If the number of pulse falling edges of the crank sensor signal is equal to first reference number from the time when the falling edge of the cam sensor signal is input, the HCU detects the missing tooth position of sensor wheel of a crank position sensor to generate the synchronization signal and starts to count the number of pulse falling edges of the crank sensor signal again.

First reference number is a predetermined proper value that may vary with engine type. The missing tooth position is located at the position where the number of pulse falling edges of the crank sensor signal is equal to first reference number from the time point when the falling edge of the cam sensor signal is input always.

In the example of FIG. 5, the missing tooth is detected if 4 pulse falling edges of the crank sensor signal are input after the falling edge of the cam sensor signal and, in this case, first reference number is 4. That is, the position that 4 pulse falling edges of the crank sensor signal are input after the falling edge of the cam sensor signal is input, is determined as the location that the missing tooth exists.

Next, if the missing tooth is detected as described above, the HCU starts to count again the number of pulse falling edges of the crank sensor signal from the detected missing tooth and, if the number of pulse falling edges of the crank sensor signal is equal to second reference number, it is determined that the current crank position is the target engine stop position.

Second reference number is a reference value that defines the target engine stop position. For example, if second reference number is 10, the position where 10 pulse falling edges of the crank sensor signal are input after the missing tooth is detected corresponds to the target engine stop position, and the engine is to be stopped at the crank position where the 10 pulse falling edges of the crank sensor signal are input.

Moreover, if the 10 pulse falling edges are actually counted from the signal of the crank sensor, it means that the current crank position reaches the target engine stop position. Accordingly, the HCU counts the number of pulse falling edges of the crank sensor signal after the missing tooth is detected and, if the number thereof is 10, it is determined that the current crank position coincides with the target engine stop position. In particular, the control process of the present invention counts the number of times when the current crank position coincides with the target engine stop position.

Subsequently, while the engine speed is below first reference speed, if the counted number is more than a predetermined number and if the engine speed (actual engine speed or an estimated engine speed calculated from the speed of the starter motor) is below second reference speed, the HCU controls the starter motor through the MCU to stop the engine at the time when the current crank position is equal to the target engine stop position (when the number of pulse falling edges of the crank sensor signal is equal to second reference number after the missing tooth is detected).

In a preferred embodiment, while the HCU of the present invention reduces the engine speed from first reference speed to second reference speed in accordance with second engine speed reduction rate by the starter motor, the HCU performs a proportional-integral-derivative (PID) control so as to obtain the target engine speed according to the second engine speed reduction rate in a section between first reference speed to second reference speed, that is, to obtain the engine speed in accordance with a velocity diagram from first reference speed (Cntl_St_rpm) to second reference speed (Eng_stp_rpm_min) as shown in FIG. 4. In this case, it is possible to use map data obtained by mapping a velocity gain value in accordance with the coolant temperature. That is, the HCU obtains the velocity gain value in accordance with the current engine coolant temperature detected by a coolant sensor from the previously input map data and then uses the same to perform the PID control for the engine speed reduction in accordance with second engine speed reduction rate.

The engine frictional force is dependent on the engine speed, i.e., the coolant temperature. Accordingly, if the HCU controls the engine speed in view of the velocity gain value based on the coolant temperature, while performing the PID control to reduce the engine speed from first reference speed to second reference speed according to engine speed second reduction rate, it is possible to improve the ride comfort of vehicle during the speed reduction control and further improve the accuracy of the final engine stop position.

As described above, according to the method of controlling the engine stop position of the present invention, it is possible to stop the engine at a given position every time when the engine is stopped, thus preventing the generation of torque ripple and vibration caused by the starter motor supplying a predetermined starting torque to the engine during the engine start-up.

Although the description has been given in a case where the motor for stopping the engine is the starter motor, it should be understood that the motor is a motor that can control the engine speed in a broad sense and may be a generator having a function of charging a battery and used as a starter motor for starting the engine.

Figure 6:
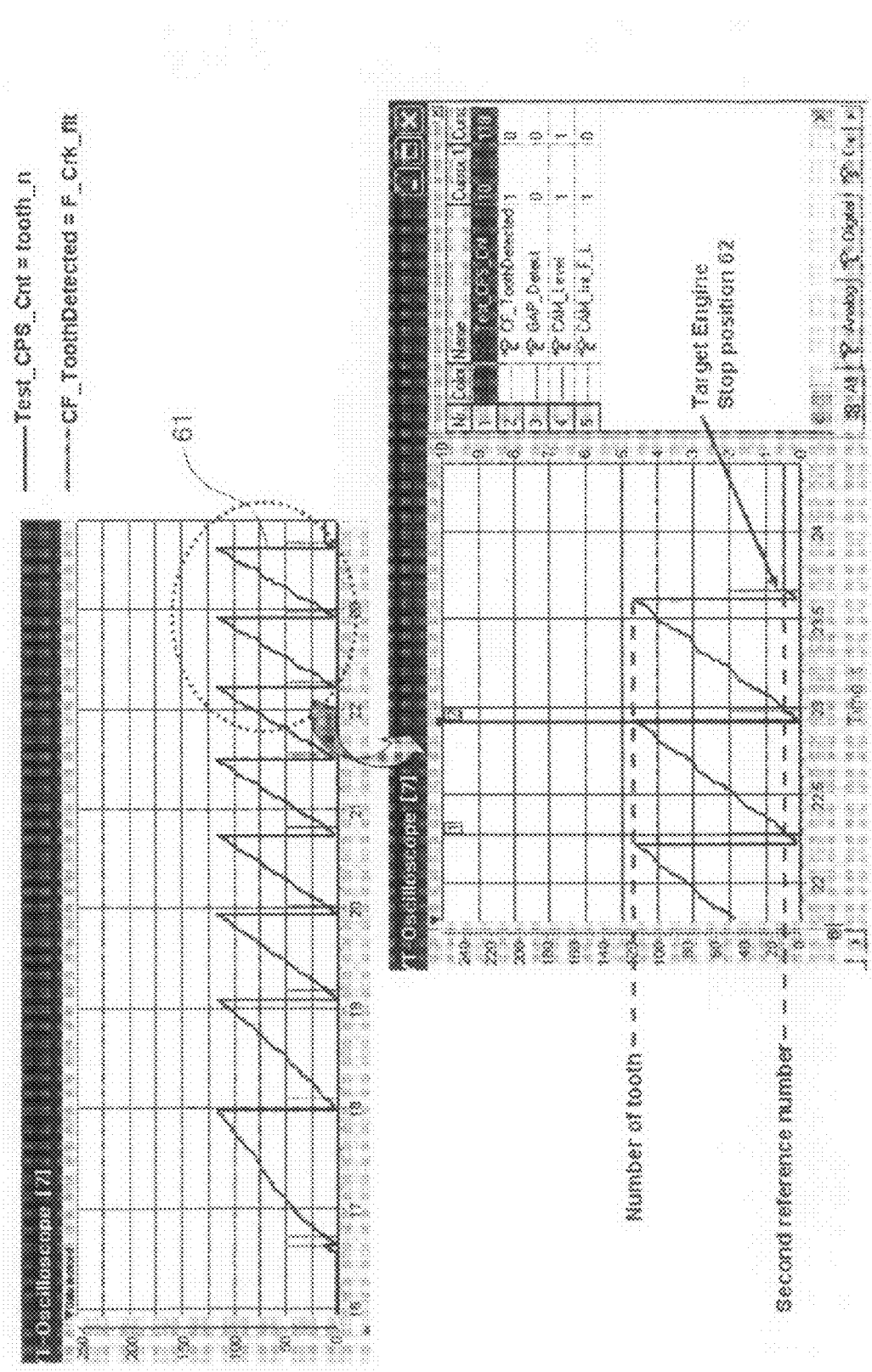
FIG. 6 is a diagram showing the results of an experiment to which the method of controlling the engine stop position in accordance with an exemplary embodiment of the present invention is applied.

FIG. 6 is a diagram showing the results of an experiment to which the inventive method is applied, in which the line 61 represents a crank sensor tooth number (Y-axis), and tooth number 0 represents a missing tooth. It can be seen from the figure that the tooth number counted from the missing tooth during the two revolutions in one cycle is 116 and then 0 corresponding to the missing tooth.

In the figure, the line 62 represents a target engine stop position.

In the example of FIG. 6, the number of teeth is 116 and second reference number is 10 (the crank position where 10 pulse falling edges are input after the missing tooth is detected is the target engine stop position).

Accordingly, it can be seen that, if the crank position where the 10 pulse falling edges are input after the missing tooth of the number 0 is detected the position coincides with the target engine stop position, i.e., if the number of times when the current crank position 61 coincides with the target engine stop position 62 is 8 for example, the engine is stopped at the next target engine stop position, i.e., at the position where the 10 pulse falling edges are input.

As described above, according to the method of controlling the engine stop position of the present invention, the HCU monitors the crankshaft position by processing the signals of the crank sensor and the cam sensor in a state where the fuel supplied to the engine is cut off and, if certain conditions are satisfied, the HCU momentarily stops the engine using the starter motor at the time when the crankshaft position coincides with a given target stop position, thus controlling the crankshaft stop position, that is, the engine stop position, whenever the engine is to be stopped. As a result, the method of controlling the engine stop position of the present invention can prevent the generation of torque ripple and vibration caused by the variation of the engine stop position during engine start-up.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method of controlling an engine stop position in a hybrid electric vehicle having a motor capable of controlling engine speed, the method comprising:
   a) reducing the engine speed according to an first engine speed reduction rate using the motor in a state where fuel supplied to the engine is cut off when the engine is to be stopped;
   b) after the engine speed is reduced to first reference speed, adjusting an actual engine speed reduction rate according to an second engine speed reduction rate using the motor, and monitoring a current crank position by processing signals of a crank sensor and a cam sensor to count the number of times when the current crank position coincides with a given target engine stop position; and
   c) if the number of times is more than a predetermined number and if the actual engine speed is equal to or below second reference speed, stopping the engine using the motor when the current crank position coincides with the target engine stop position.

2. The method of claim 1, wherein, in the process of reducing the engine speed, the control unit performs a proportional-integral-derivative control using a velocity gain value in accordance with the current engine coolant temperature obtained from previously input map data so as to obtain the target engine speed in accordance with second engine speed reduction rate.

3. The method of claim 1, wherein, in step b), after at least a missing tooth of the crank sensor is detected from the signals of the crank sensor and the cam sensor and a pulse falling edge of the crank sensor is counted from the detected missing tooth, if the counted number of pulse falling edges is equal to a falling edge reference number equal to the target engine stop position, it is determined that the current crank position coincides with the target engine stop position.

4. The method of claim 2, wherein, in the process of detecting the missing tooth, after counting the number of pulse falling edges of the crank sensor signal from a time when a falling edge of the cam sensor signal is input, if the counted number of falling edges is equal to a predetermined reference number, the missing tooth is detected.

* * * * *